(12) United States Patent
Maxim

(10) Patent No.: US 12,088,960 B2
(45) Date of Patent: *Sep. 10, 2024

(54) ENABLING SUB-MEETINGS IN ENCRYPTED VIDEO CONFERENCES

(71) Applicant: Zoom Video Communications, Inc., San Jose, CA (US)

(72) Inventor: Michael Maxim, New York, NY (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/840,037

(22) Filed: Jun. 14, 2022

(65) Prior Publication Data

US 2023/0008701 A1  Jan. 12, 2023

Related U.S. Application Data

(63) Continuation of application No. 17/242,673, filed on Apr. 28, 2021, now Pat. No. 11,394,924.

(51) Int. Cl.
*H04N 7/15* (2006.01)
*H04L 9/14* (2006.01)

(52) U.S. Cl.
CPC ............ *H04N 7/155* (2013.01); *H04L 9/14* (2013.01); *H04N 7/152* (2013.01)

(58) Field of Classification Search
CPC ........... H04N 7/155; H04N 7/152; H04L 9/14
See application file for complete search history.

(56) References Cited

U.S. PATENT DOCUMENTS 11,394,924 B1   7/2022  Maxim
2004/0028199 A1*  2/2004  Carlson ............... H04M 1/247
                                                  379/93.21

(Continued)

OTHER PUBLICATIONS

U.S. Appl. No. 17/242,673, "Non-Final Office Action" dated Oct. 14, 2021, 10 pages.

(Continued)

*Primary Examiner* — Amal S Zenati
(74) *Attorney, Agent, or Firm* — Kilpatrick Townsend & Stockton LLP

(57) ABSTRACT

One example method includes facilitating communications between a plurality of participants in a main meeting of a video conference, the communications encrypted using a first encryption key, the video conference provider lacking access to the first encryption key and a first decryption key; in response to receiving a command from a host to establish one or more sub-meetings, establishing the sub-meetings; for each sub-meeting, selecting a sub-meeting host; transmitting an indication that the selected sub-meeting host is a sub-meeting host; in response to receiving a request from a first participant to join a first sub-meeting, joining the first participant to the first sub-meeting; and facilitating sub-meeting communications between the sub-meeting host and the first participant, the sub-meeting communications encrypted using second encryption and decryption keys, the second encryption and decryption keys different than the first encryption and decryption keys, the video conference provider lacking access to the second encryption and decryption keys.

20 Claims, 8 Drawing Sheets

(56) References Cited

U.S. PATENT DOCUMENTS

| | | | |
|---|---|---|---|
| 2014/0111597 A1 | 4/2014 | Anderson et al. | |
| 2014/0362165 A1* | 12/2014 | Ackerman | G06Q 10/10 |
| | | | 348/14.07 |
| 2016/0073058 A1* | 3/2016 | Bader-Natal | H04L 65/4038 |
| | | | 348/14.03 |
| 2016/0088259 A1* | 3/2016 | Anderson | H04N 7/157 |
| | | | 348/14.03 |
| 2018/0359811 A1* | 12/2018 | Verzun | H04L 12/28 |

OTHER PUBLICATIONS

U.S. Appl. No. 17/242,673, "Notice of Allowance" dated Mar. 17, 2022, 7 pages.
Krohn, "Zoom Rolling Out End-to-End Encryption Offering—Zoom Blog", Oct. 14, 2020.
PCT/US2022/024583, "International Search Report and Written Opinion" dated Jul. 21, 2022, 15 pages.
Spohrer, "Breakout Rooms in Zoom Tech Documentation" dated Jan. 29, 2021.
PCT/US2022/024583, "International Preliminary Report on Patentability", dated Nov. 9, 2023, 5 pages.

* cited by examiner

ENABLING SUB-MEETINGS IN ENCRYPTED VIDEO CONFERENCES

CROSS-REFERENCE

This application is a continuation of U.S. patent application Ser. No. 17/242,673, filed Apr. 28, 2021, titled "Enabling Sub-Meetings in Encrypted Video Conferences," the entirety of which is hereby incorporated by reference.

FIELD

The present disclosure generally relates to encrypted video conferences and more particularly relates to systems and methods for enabling sub-meetings in encrypted video conferences.

BACKGROUND

Videoconferencing has become a common way for people to meet as a group, but without being at the same physical location. Participants can be invited to a video conference meeting, join from their personal computers or telephones, and are able to see and hear each other and converse largely as they would during an in-person group meeting or event. The advent of user-friendly video conferencing software has enabled teams to work collaboratively despite being dispersed around the country or the world. It has also enabled families and friends to engage with each other in more meaningful ways, despite being physically distant from each other.

SUMMARY

Various examples are described for systems and methods for enabling sub-meetings in encrypted video conferences. One example method includes facilitating, by a video conference provider, communications between a plurality of participants in a main meeting of a video conference, the communications encrypted using a first encryption key, the video conference provider lacking access to the first encryption key and a first decryption key corresponding to the first encryption key; in response to receiving a command from a host of the video conference to establish one or more sub-meetings of the main meeting, establishing the one or more sub-meetings; for each sub-meeting, selecting, by the video conference provider, a sub-meeting host, each sub-meeting host being a different participant of the plurality of participants; transmitting, by the video conference provider, an indication that the selected sub-meeting host is a sub-meeting host of the corresponding sub-meeting; in response to receiving a request from a first participant of the plurality of participants to join a first sub-meeting of the one or more sub-meetings, joining the first participant to the first sub-meeting; and facilitating, by the video conference provider, sub-meeting communications between the sub-meeting host corresponding to the first sub-meeting and the first participant, the sub-meeting communications encrypted using second encryption and decryption keys, the second encryption and decryption keys different than the first encryption and decryption keys, the video conference provider lacking access to the second encryption and decryption keys.

Another example method includes joining, by a client device, a main meeting of a video conference hosted by a video conference provider; receiving and decrypting using a first decryption key, by the client device via the video conference provider, encrypted multimedia streams from one or more participants of the main meeting, the encrypted multimedia streams encrypted using a first encryption key, the first decryption key corresponding to the first encryption key; joining, by the client device, a sub-meeting of the video conference; receiving, by the client device, an indication identifying the client device as a host of the sub-meeting; obtaining second encryption and decryption keys corresponding to the sub-meeting; distributing the second encryption and decryption keys to sub-meeting participants of the sub-meeting; not distributing the second encryption and decryption keys to the video conference provider; and receiving and decrypting using the second decryption key, via the video conference provider, encrypted sub-meeting multimedia streams from one or more of the sub-meeting participants.

One example system includes a communications interface; a non-transitory computer-readable medium; and one or more processors communicatively coupled to the communications interface and the non-transitory computer-readable medium, the one or more processors configured to execute processor-executable instructions stored in the non-transitory computer-readable medium to facilitate communications between a plurality of participants in a main meeting of a video conference, the communications encrypted using a first encryption key, the video conference provider lacking access to the first encryption key and a first decryption key corresponding to the first encryption key; in response to receiving a command from a host of the video conference to establish one or more sub-meetings of the main meeting, establish the one or more sub-meetings; for each sub-meeting, select a sub-meeting host, each sub-meeting host being a different participant of the plurality of participants; transmit an indication that the selected sub-meeting host is a sub-meeting host of the corresponding sub-meeting; in response to receiving a request from a first participant of the plurality of participants to join a first sub-meeting of the one or more sub-meetings, join the first participant to the first sub-meeting; and facilitate sub-meeting communications between the sub-meeting host corresponding to the first sub-meeting and the first participant, the sub-meeting communications encrypted using second encryption and decryption keys, the second encryption and decryption keys different than the first encryption and decryption keys, the video conference provider lacking access to the second encryption and decryption keys.

Another example system includes a communications interface; a non-transitory computer-readable medium; and one or more processors communicatively coupled to the communications interface and the non-transitory computer-readable medium, the one or more processors configured to execute processor-executable instructions stored in the non-transitory computer-readable medium to join a main meeting of a video conference hosted by a video conference provider; receive and decrypt using a first decryption key, via the video conference provider, encrypted multimedia streams from one or more participants of the main meeting, the encrypted multimedia streams encrypted using a first encryption key, the first decryption key corresponding to the first encryption key; join a sub-meeting of the video conference; receive an indication identifying the client device as a host of the sub-meeting; obtain second encryption and decryption keys corresponding to the sub-meeting; distribute the second encryption and decryption keys to sub-meeting participants of the sub-meeting; not distribute the second encryption and decryption keys to the video conference provider; and receive and decrypt using the second decryption key, via the video conference provider, encrypted sub-meeting multimedia streams from one or more of the sub-meeting participants.

One example non-transitory computer-readable medium comprises processor-executable instructions stored in the non-transitory computer-readable medium to cause one or more processors to facilitate communications between a plurality of participants in a main meeting of a video conference, the communications encrypted using a first encryption key, the video conference provider lacking access to the first encryption key and a first decryption key corresponding to the first encryption key; in response to receiving a command from a host of the video conference to establish one or more sub-meetings of the main meeting, establish the one or more sub-meetings; for each sub-meeting, select a sub-meeting host, each sub-meeting host being a different participant of the plurality of participants; transmit an indication that the selected sub-meeting host is a sub-meeting host of the corresponding sub-meeting; in response to receiving a request from a first participant of the plurality of participants to join a first sub-meeting of the one or more sub-meetings, join the first participant to the first sub-meeting; and facilitate sub-meeting communications between the sub-meeting host corresponding to the first sub-meeting and the first participant, the sub-meeting communications encrypted using second encryption and decryption keys, the second encryption and decryption keys different than the first encryption and decryption keys, the video conference provider lacking access to the second encryption and decryption keys.

Another example non-transitory computer-readable medium comprises processor-executable instructions stored in the non-transitory computer-readable medium to cause one or more processors to join a main meeting of a video conference hosted by a video conference provider; receive and decrypt using a first decryption key, via the video conference provider, encrypted multimedia streams from one or more participants of the main meeting, the encrypted multimedia streams encrypted using a first encryption key, the first decryption key corresponding to the first encryption key; join a sub-meeting of the video conference; receive an indication identifying the client device as a host of the sub-meeting; obtain second encryption and decryption keys corresponding to the sub-meeting; distribute the second encryption and decryption keys to sub-meeting participants of the sub-meeting; not distribute the second encryption and decryption keys to the video conference provider; and receive and decrypt using the second decryption key, via the video conference provider, encrypted sub-meeting multimedia streams from one or more of the sub-meeting participants.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
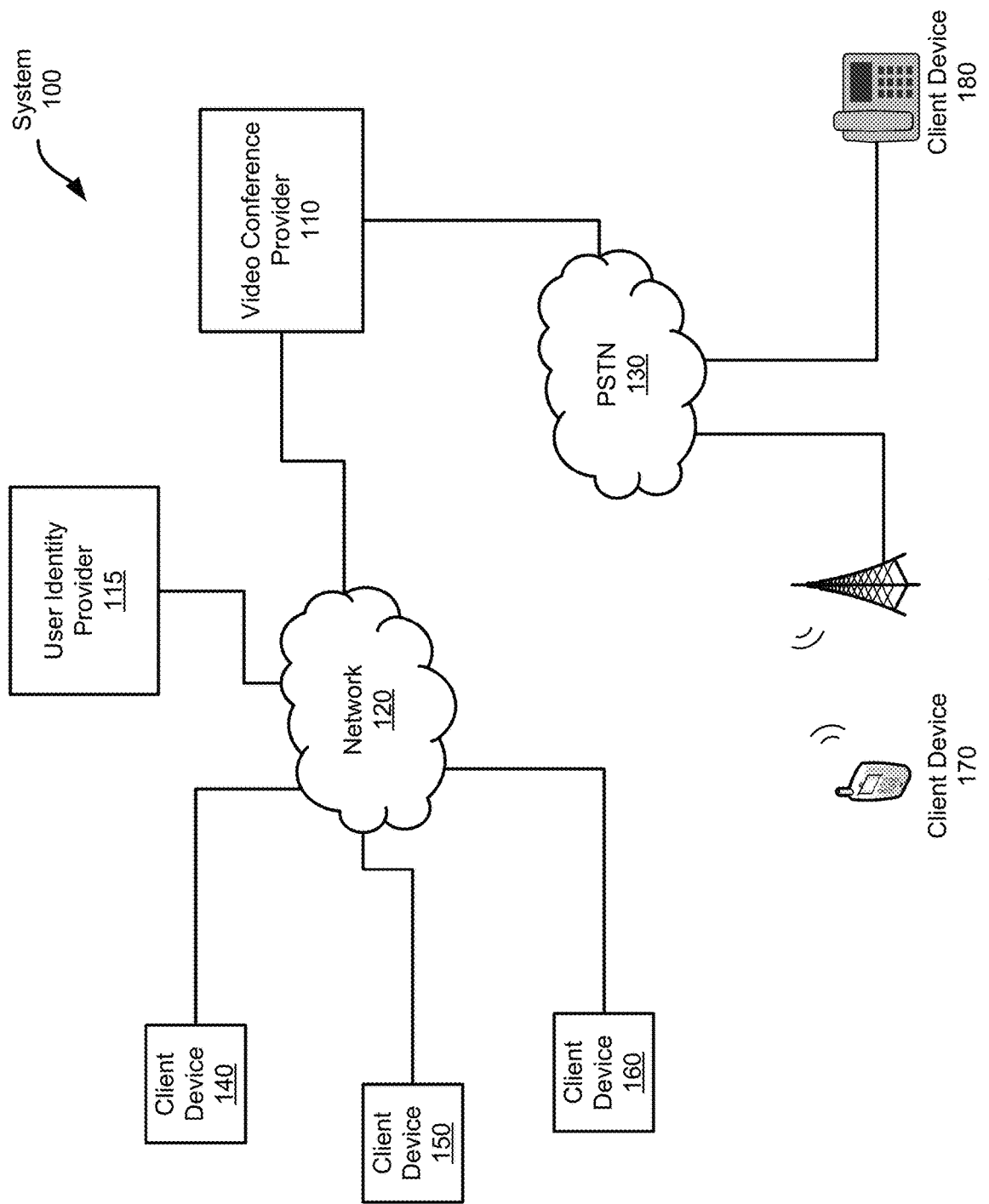
FIGS. 1-2 show example systems for enabling sub-meetings in encrypted video conferences.

Examples are described herein in the context of systems and methods for enabling sub-meetings in encrypted video conferences. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

During a video conference meeting (or "meeting"), participants may engage in discussions with each other, facilitated by sharing video and audio streams (each a "multimedia stream") from microphones or cameras attached to their client devices through video conferencing services provided by a video conference provider. Multimedia streams received by each client device may then be displayed for the respective participant to view or hear. During meetings, participants may also share other content, such as presentations, pre-recorded videos or images, etc., which are provided as multimedia streams to the other participants for them to view or discuss.

However, some meetings may involve discussion or presentation of confidential information, whether proprietary corporate information, information protected by privacy statutes (e.g., the Health Insurance Portability and Accountability Act or "HIPAA"), or simply information the participants would like to keep private. To help ensure confidentiality of the meeting, the video conference provider may allow the participants to encrypt content transmitted during the meeting. In some cases, the content may be encrypted between the participants and the video conference provider, where it may be decrypted to enable features, such as recording or transcription before being re-encrypted and transmitted to the participants.

However, such an approach can enable a malicious actor to potentially access the unencrypted data at the video conference provider or to impersonate the video conference provider, thereby enabling non-participants to view any confidential information that is discussed during the meeting. Another approach to encryption, referred to as end-to-end (or "E2E") encryption, encrypts all multimedia streams sent by the participants and only the participants are provided with the cryptographic keys needed to decrypt the multimedia streams. The cryptographic keys are not provided to the video conference provider (though encrypted copies of the cryptographic keys may be provided to the video conference provider, in some examples), and are only provided to the participants. Thus, while the video conference provider may facilitate the delivery of encrypted multimedia streams to the participants' client devices, the video conference provider itself is unable to decrypt the multimedia streams.

One logistical aspect of E2E-encrypted meetings is that a participant in the meeting, rather than the video conference provider, must generate and provide a cryptographic key (or keys) to the participants to use to encrypt and decrypt the various multimedia streams. In a conventional E2E meeting, the host (or a co-host) of the meeting is assigned that responsibility, such as by virtue of being the host or by the video conference provider. However, one feature of video conference meetings is that they may employ "breakout" rooms (or "sub-meetings") to allow participants to separate into smaller groups to discuss particular topics of interest.

When a meeting involves breakout rooms, the breakout rooms may then each have their own cryptographic key (or keys) so that only participants in the breakout room are able to decrypt any multimedia streams exchanged during the breakout room meeting. However, because the video conference provider is excluded from having access to the breakout rooms' cryptographic keys, a participant in the breakout room must generate and distribute cryptographic keys to the participants (the "breakout room host"). Further, because breakout room participants may be disconnected from the breakout room, the participant that generates and distributes the kays may be disconnected, intentionally or otherwise, a new breakout room participant must be selected to generate and distribute new cryptographic keys if any change to the cryptographic key is to be made.

To enable breakout rooms in E2E meetings, the video conference provider may select a participant in each breakout room to act as the breakout room host, such as based on information about the participants, e.g., whether they have been authenticated or not, whether they are a host or co-host of the main meeting, whether they have been previously designated as a presenter in the breakout room, certain digital information about the participant, e.g., a user identifier, or the video conference provider may randomly select a breakout room host.

Once the breakout room host is selected, the corresponding client device is notified that it is the host, at which time, it generates a suitable cryptographic key (or cryptographic keys) and securely distributes them to the other participants in the breakout room. It may also distribute a copy of the key(s) to the host of the main meeting to enable them to join or monitor any or all of the breakout rooms.

If a breakout room host is disconnected from the breakout room before the breakout room ends, a new breakout room host may be selected, such as by the video conference provider according to the same (or different) criteria. The new breakout room host may then distribute new cryptographic keys, or it may continue to use the previously distributed cryptographic keys.

Using such functionality, participants in the main meeting may be divided into groups to join breakout rooms without compromising the privacy of the breakout rooms, such as by allowing the video conference provider access to the multimedia streams shared by the participants. Thus, confidential information may be securely shared between participants in a breakout room without worry about any eavesdropping by the video conference provider or participants in other breakout rooms. This may enable richer video conferencing capabilities to video conference providers and their clients, and provide greater control over meeting security to the clients.

This illustrative example is given to introduce the reader to the general subject matter discussed herein and the disclosure is not limited to this example. The following sections describe various additional non-limiting examples and examples of systems and methods for enabling sub-meetings in encrypted video conferences.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 120 can be located within a private network to provide video conferencing services to devices within the private network, or it can be connected to a public network, e.g., the internet, so it may be accessed by anyone. Some examples may even provide a hybrid model in which a video conference provider 120 may supply components to enable a private organization to host private internal video conferences or to connect its system to the video conference provider 120 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
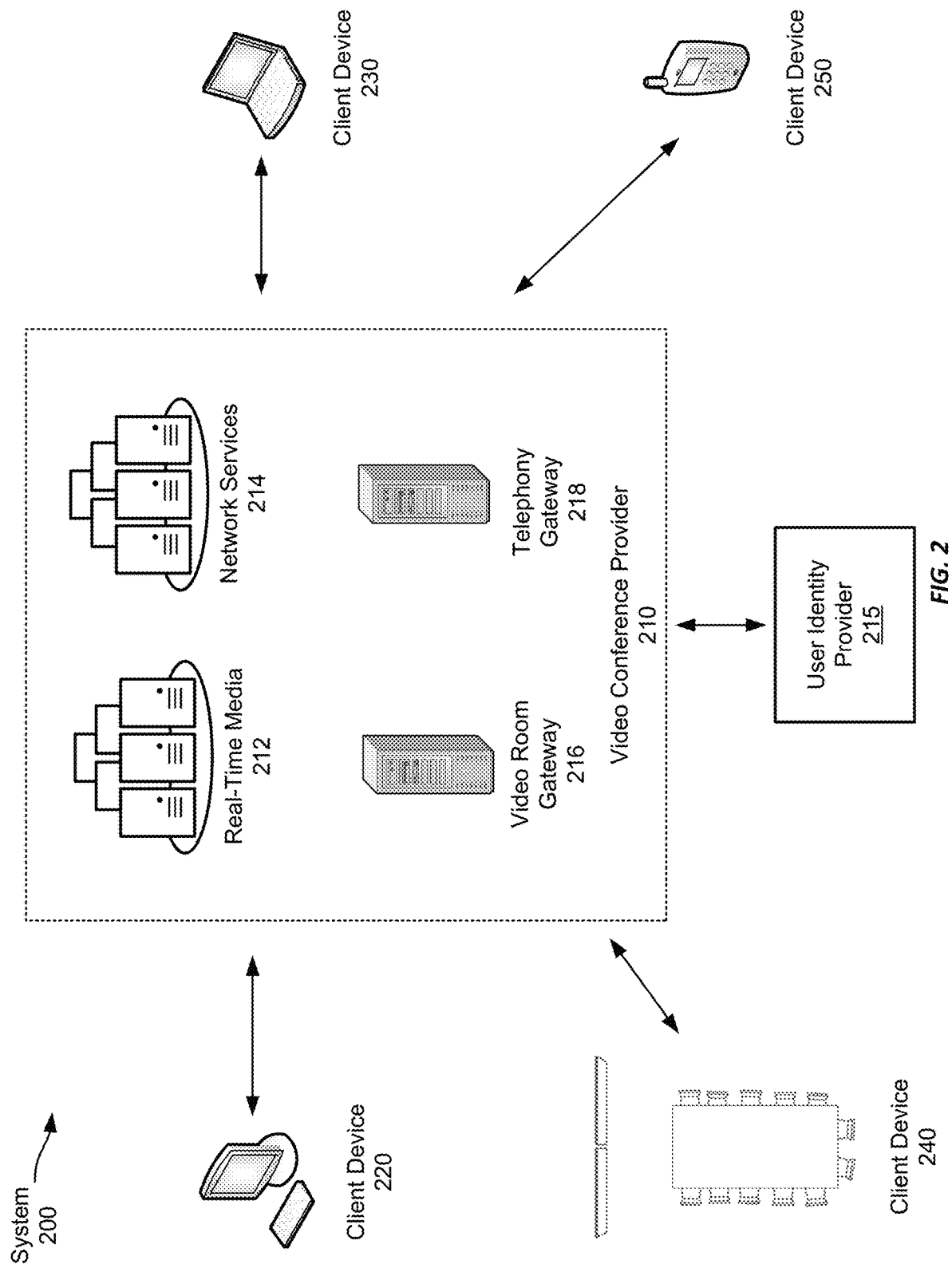

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can making conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the video conference provider 210 may receive multimedia streams from the various participants and publish those streams to the various participants to subscribe to and receive. Thus, the video conference provider 210 notifies a client device, e.g., client device 220, about various multimedia streams available from the other client devices 230-250, and the client device 220 can select which multimedia stream(s) to subscribe to and receive. In some examples, the video conference provider 210 may provide to each client device the available streams from the other client devices, but from the respective client device itself, though in other examples it may provide all available streams to all available client devices. Using such a multiplexing technique, the video conference provider 210 may enable multiple different streams of varying quality, thereby allowing client devices to change streams in real-time as needed, e.g., based on network bandwidth, latency, etc.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider.

The video room gateway servers 216 provide specialized authentication and communication with the dedicated video conferencing hardware that may not be available to other client devices 220-230, 250. For example, the video conferencing hardware may register with the video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3A:
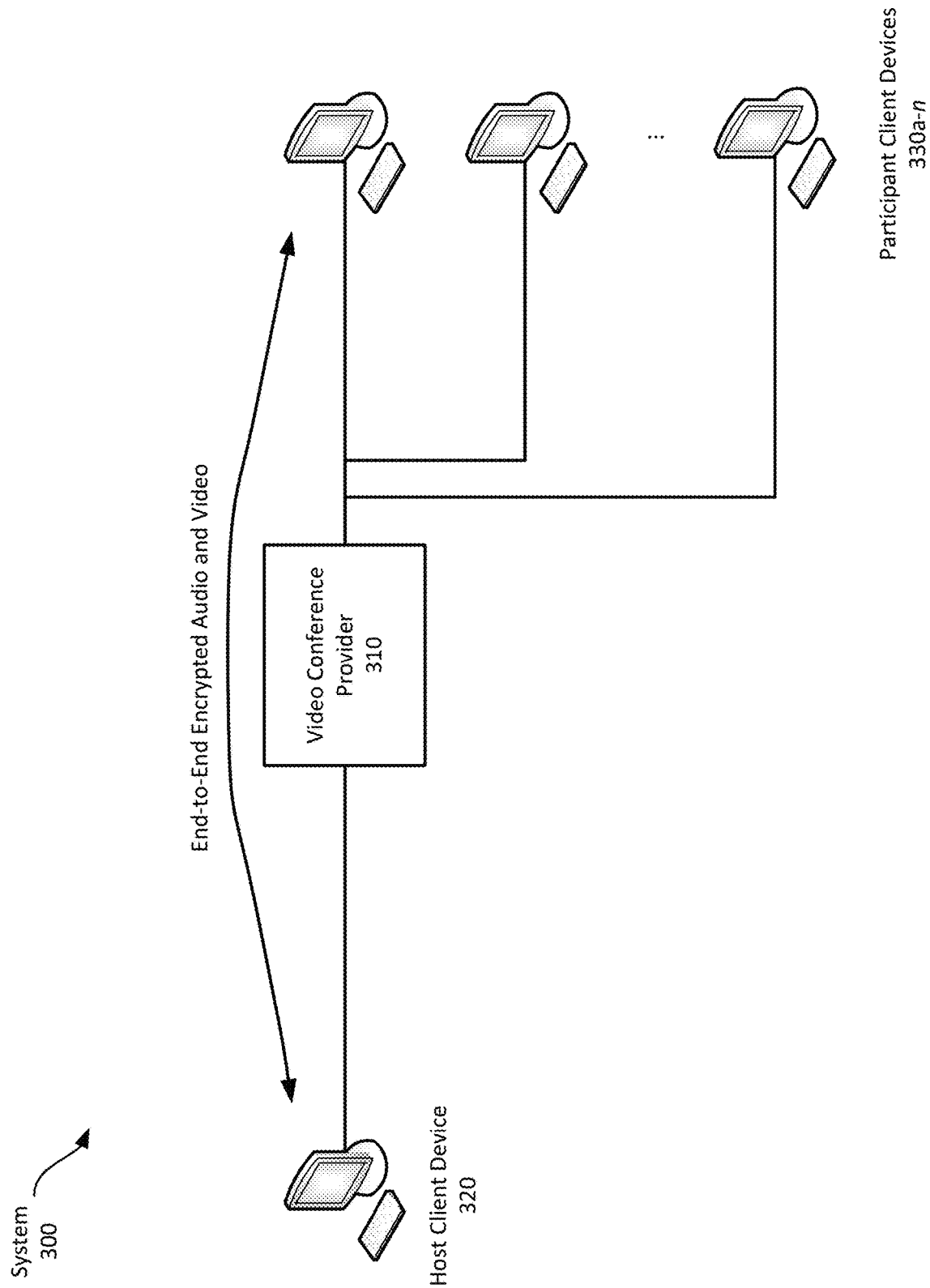
FIGS. 3A-3B show an example system for enabling sub-meetings in encrypted video conferences.

Referring now to FIG. 3A, FIG. 3A illustrates a system 300 that enables users to engage in an E2E-encrypted video conference. The system includes a host client device 320 and multiple participant client devices 330*a-n* (n represents any suitable number of participant client devices) and a video conference provider 310. The client devices 320, 330*a-n* are connected to the video conference provider 310 through one or more communication networks (not shown), generally as described above with respect to FIGS. 1 and 2.

In an E2E-encrypted video conference, each participant joins the video conference with their respective client device 320-330*a-n* and the host client device 320 establishes a meeting key, e.g., a symmetric cryptographic key, that will be used to encrypt and decrypt the audio and video streams. Each of the participants' client devices 330*a-n* also has their own respective public/private key pair that can be used to communicate with the respective participant's client device 330*a-n* and each participant's public key is published or distributed in any suitable manner, such as by registering it with a trusted entity or by generating a cryptographic signature using a private key and allowing the host or other participants to use a published copy of the public key to verify the signature.

Once each participant's public key has been verified, the host client device 320 can securely distribute the meeting key to the participant client devices 330*a-n* by encrypting the meeting key using the participant's respective public keys. For example, the host client device 320 may generate and send an encrypted message including the meeting key to each participant client device 330*a-n* using the respective participant's public key. Upon receiving successfully decrypting the meeting key, the respective participant client devices 330*a-n* are then able to encrypt and decrypt meeting content.

In system 300 shown in FIG. 3A, host client device 320 initially connects to the video conference provider 310 and requests that the video conference provider create a new meeting. Once the meeting is created, host client device 320 is designated as the host of the meeting and establishes a meeting key to use to provide for E2E encryption in the meeting, but does not provide it to the video conference provider 310. Subsequently, a participant client device 330*a* joins the meeting and generates and provides a cryptographically signed message using its private key to the host client device 320, which verifies the message using the participant's public key. After verifying the public key, the host client device 320 encrypts the meeting key using the participant's public key and transmits it to the participant client device 330*a*, which decrypts the meeting key. Once the meeting key has been successfully received and decrypted by the participant client device 330*a*, it may begin transmitting encrypted audio and video using the meeting key.

In this example, each client device 320, 330*a-n* generates a per-stream encryption key by computing a new key using a non-secret stream ID for each data stream it transmits (e.g., audio and video), and uses the corresponding stream encryption key to encrypt its audio and video stream(s). The video conference provider 310 receives the various encrypted streams and distributes them to the various participating client devices 320, 330, generally as described above with respect to FIGS. 1 and 2. The respective client devices 320, 330*a-n* can then use the meeting key to decrypt the incoming streams and view the content of the video conference.

However, as part of this process, the video conference provider 310 does not have access to the meeting key. Thus, the video conference provider 310 is unable to decrypt the various audio and video streams. But because the individual streams are separately received from the various participants, the video conference provider 310 is able to identify the source of each stream and therefore it can properly multiplex the streams for delivery to each participant. It should be appreciated that a copy of any meeting key used during the course of an E2E-encrypted meeting may be encrypted and stored at the video conference provider 310. This may allow the video conference provider 310 to record the encrypted contents of the meeting, which can be retrieved later along with the encrypted meeting key(s). If the device that obtains the encrypted recording and the encrypted meeting key(s) is able to decrypt the meeting key(s), it may then access the encrypted recording. Such functionality may be desirable for some users. However, it should be appreciated that by "lacking access" to the meeting keys, it means that the video conference provider is unable to access the unencrypted meeting keys, e.g., because it does not have a copy of the key at all or because it does not have information needed to decrypt an encrypted meeting key it has received, not necessarily that the video conference provider 210 does not have a copy of the meeting key at all.

Figure 3B:
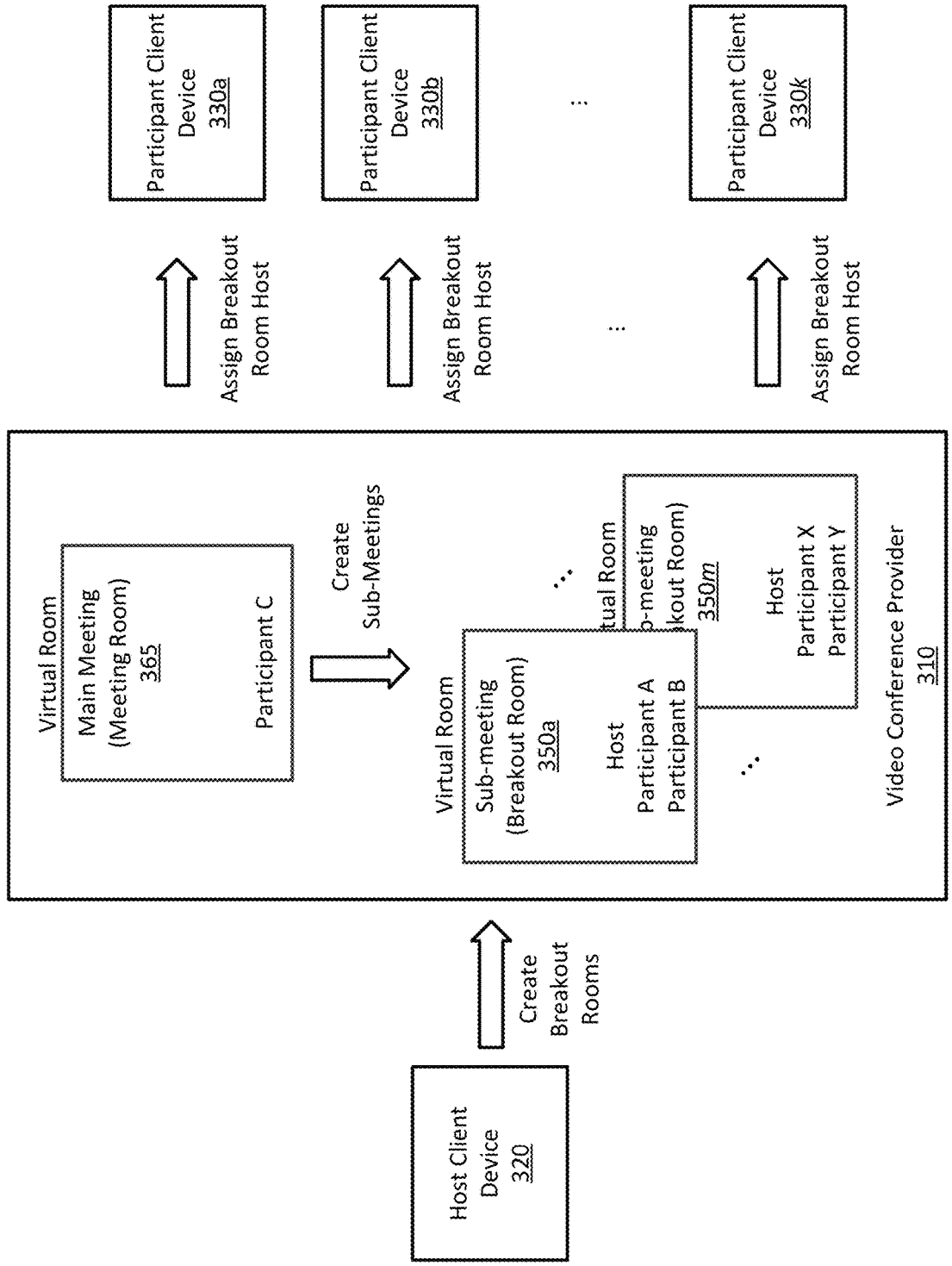

Referring now to FIG. 3B, FIG. 3B illustrates creation of breakout rooms in an E2E-encrypted meeting. In the example, the video conference provider 310 establishes a main meeting 365, which is nominally in a main meeting room. During the meeting, the host and the various participants are "within" the main meeting room 365. The video conference provider 310 receives multimedia streams from the host client device 330 and from the participant client devices 320*a-m* and then publishes those streams and notifies the various participants about the multimedia streams to enable them to subscribe to the appropriate streams. The various participant client devices 320*a-m* subscribe to these multimedia streams to receive the audio and video streams from the host, other participants (e.g., only a subset of them), shared content, etc.

At some point during the meeting, the host client device 320 instructs the video conference provider 310 to create breakout rooms 350*a-n* from the main meeting 365. These breakout rooms 350*a-n* may have been pre-configured prior to the meeting or may be dynamically created during the meeting, e.g., based on a number of participants and a maximum number of participants per breakout room. To create the breakout rooms 350*a-n*, the video conference provider establishes a number of additional meeting rooms similar to the main meeting. For example, the video conference provider 310 may establish additional new meetings having their own access information, but that are associated with the main meeting 365. For example, the video conference provider 310 may internally share participant information between the main meeting 365 and the breakout rooms 350*a-n*, or it may facilitate or forego authentication of participants who had been authenticated in the main meeting 365 and are transitioning to a breakout room 350*a-n*.

Because the breakout rooms 350*a-n* are intended to be a part of the meeting hosted in the main meeting room 365, the breakout room meetings 350*a-n* are not separately scheduled meetings by the video conference provider, e.g., participants will not receive calendar invitation or email to join the breakout room. Instead, the video conference provider 310, as a part of establishing one or more breakout rooms, generates information that the participants' client devices 340*a-m* may use to join one (or more) of the breakout rooms. Such information may include information to subscribe to one or more multimedia streams provided in the particular breakout room, which may be a URI (e.g., a URL).

When a participant joins a breakout room 350*a-n*, their client device subscribes to one or more multimedia streams available in the breakout room 350*a-n* that they joined and unsubscribes from the multimedia streams in the main meeting room 365. Thus, the participant begins to receive audio and video from one or more other participants in the same breakout room (assuming other participants are in the room) and, depending on the configuration of the breakout room, may begin providing their own multimedia streams to the breakout room to enable interaction with the other participants. At a later time, when the participant leaves the breakout room 350*a-n*, they may re-subscribe to the multimedia streams in the main meeting room 365 and unsubscribe from the multimedia streams in the breakout room 350*a-n*.

As discussed above, because E2E-encrypted meetings rely on a meeting participant, e.g., the host, to generate and distribute cryptographic meeting keys to the other meeting participants, a participant in each breakout room performs such functionality. Thus, after creating the various sub-meetings 350*a-m* to serve as the breakout rooms, the video conference provider 310 in this example identifies a participant for each sub-meeting 350*a-m* to serve as the "host" 330*a-k* for the sub-meeting. Depending on how participants are allocated to the breakout rooms, each sub-meeting host may be selected before or after the participant has joined the corresponding sub-meeting 350*a-m*. For example, if breakout room assignments are predetermined, the video conference provider 310 may pre-assign a participant for each breakout room to serve as the host for the corresponding sub-meeting 350*a-m*. When the participants begin to transition to the sub-meetings 350*a-m* during the meeting, they will join the meeting, but until the sub-meeting host has joined, they may be unable to transmit multimedia streams because they have not received a cryptographic key. Once the sub-meeting host has joined the sub-meeting 350*a-m*, it may generate and distributed a cryptographic meeting key to the other participants in the sub-meeting 350*a-m* generally as described above with respect to FIG. 3. Once the sub-meeting participants have received the cryptographic meeting key, they can begin generating and transmitting multimedia streams, which the video conference provider can multiplex, generally as discussed above with respect to FIGS. 1-2.

While the discussion above involved the video conference provider 310 selecting a participant from a predetermined allocation of participants to breakout rooms, in some examples, the selection may be dynamically made as participants transition to breakout rooms. Participants may be able to self-select a breakout room or may receive an assignment in real-time when the breakout rooms 350*a-n* are created. For example, the meeting host may manually assign participants to breakout rooms 350*a-n* as breakout rooms 350*a-n* are created.

To select a sub-meeting host 330*a-k*, the video conference provider 310 may use any suitable technique. For example, the video conference provider 310 may randomly assign a sub-meeting participant as a host, or it may assign the first participant to join the sub-meeting. Alternatively, the video conference provider 310 may obtain unique user identifiers for each participant, e.g., a unique identifier assigned when each participant registered with a user identity provider or with the video conference provider. For example, the video conference provider 310 may assign the participant with the lowest (or highest) unique user identifier in a sub-meeting as the sub-meeting host. However, it may be desirable in some cases to use specific criteria to select a sub-meeting host.

As discussed, E2E-encrypted meetings may involve highly confidential information and thus, the participants may all be authenticated by a user identity provider 315 before they are allowed into the meeting. Such authentication may involve obtaining information about each participants' job title, the division of a company or other organization in which they work, security level authorizations, etc. Such information may be employed to determine the host for a sub-meeting 350*a-m*. For example, a breakout room may include a manager for a corporate division and a number of employees in that division. During authentication, the video conference provider 310 may obtain such information from a corporate user identity server and may then assign the manager as the sub-meeting host or a participant having the highest-level security authorization as the sub-meeting host. It should be appreciated, however, that any suitable criteria may be employed according to different examples.

Figure 4:
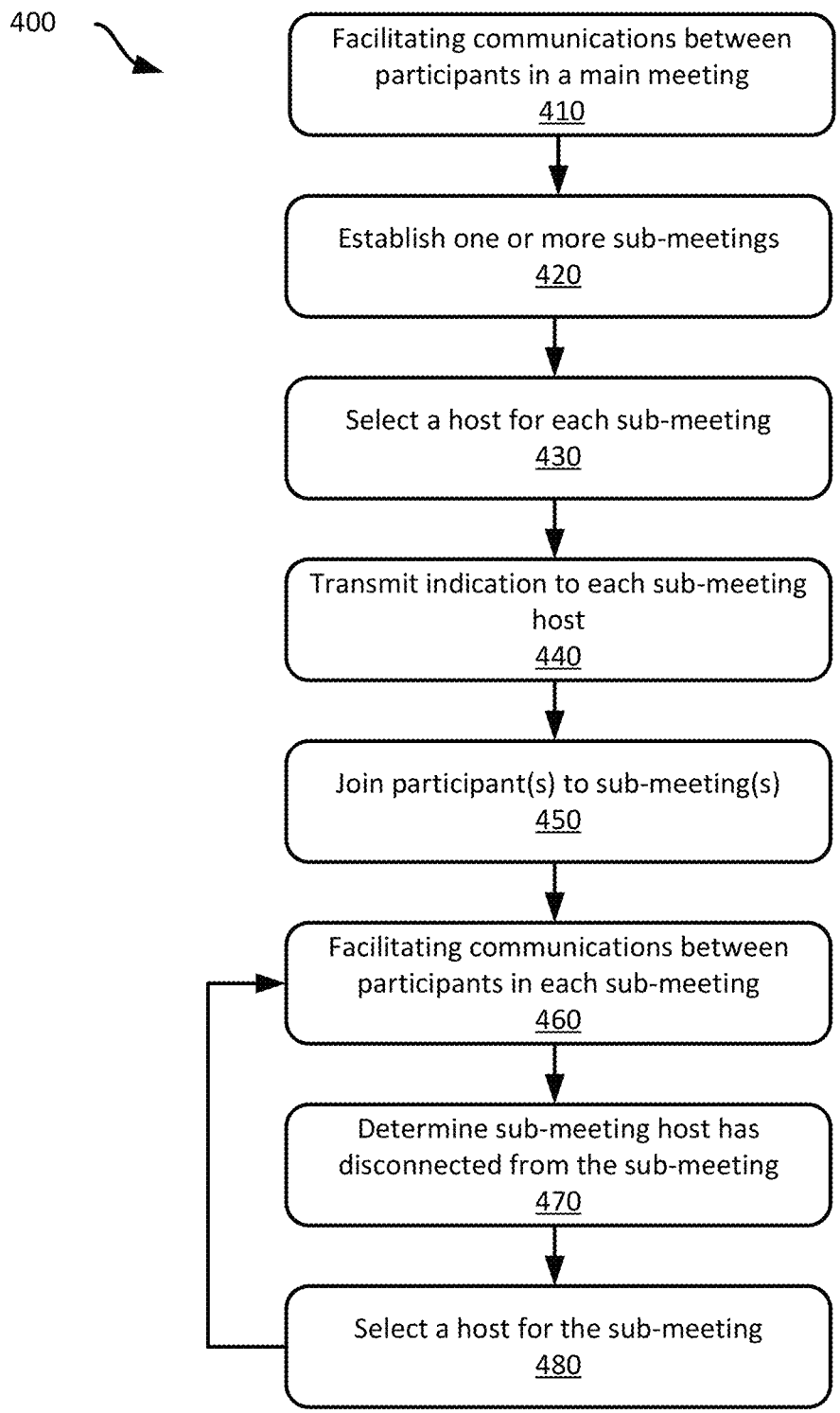
FIGS. 4-6 show example methods for enabling sub-meetings in encrypted video conferences.

Referring now to FIG. 4, FIG. 4 shows an example method 400 for enabling sub-meetings in encrypted video conferences. This example method 400 will be discussed with respect to the example system 300 shown in FIGS. 3A-3B, but it should be appreciated that any suitable system according to this disclosure may be employed.

At block 410, the video conference provider 310 facilitates communications between a plurality of participants in a main meeting of a video conference where the communications are encrypted using a first encryption key. However, as described above, the video conference provider 310 lacks access to the first encryption key and a first decryption key corresponding to the first encryption key. In this example, the host of the main meeting established a symmetric cryptographic key used to encrypt and decrypt multimedia streams within the main meeting, and thus the encryption and decryption keys are the same key; however, in some examples, asymmetric encryption and decryption keys may be employed. In this example, the host client device 320 has not provided the encryption and decryption keys to the video conference provider 310, and thus the video conference provider 310 lacks access because it does not have copies of the keys. However, in some examples, the host client device 320 may encrypt the encryption and decryption keys and send the encrypted keys to the video conference provider 310. This may allow the encrypted keys to be retrieved later and used to decrypt recorded meeting content (or for other purposes). However, the video conference provider 310 is not provided with the key needed to decrypt the encrypted keys and thus it lacks access to them, despite having a copy of them.

To enable the main meeting participants 320a-m to communicate with each other, the host has distributed the encryption and decryption keys to each of the participants. Again, because a symmetric key is employed in this example, the host has only distributed one key that is used for both encryption and decryption; however, asymmetric keys or other encryption techniques may be employed according to other examples. The participants then use the encryption and description keys to encrypt and decrypt multimedia streams within the main meeting. These encrypted multimedia streams are sent to the video conference provider, which distributes them to the various meeting participants generally as discussed above with respect to FIGS. 1-2, thereby facilitating communications between the participants.

At block 420, the video conference provider 310 establishes one or more sub-meetings. In this example, the video conference provider 310 establishes the one or more sub-meetings in response to receiving a command from the host of the video conference.

At block 430, the video conference provider 310 selects a host for each of the one or more sub-meetings. As discussed above with respect to FIG. 3B, the video conference provider may select any sub-meeting participant as a host for the corresponding sub-meeting. For example, a sub-meeting host may be selected randomly, by being the first participant to enter the sub-meeting, or based on a unique user identifier for each participant. In some examples, the video conference provider may receive an identification of one or more sub-meeting hosts from the main meeting host. For example, the main meeting host may assign participants as sub-meeting uses using a user interface of video conference software executed by the host client device 320. The assignments may then be provided to the video conference provider 310, which then selects each of the participants as a sub-meeting host for a corresponding sub-meeting. In some examples, the video conference provider 310 may select a sub-meeting host based on information about sub-meeting participants, such as based on job title, security authorization level, etc. Still other techniques may be used to select a sub-meeting host.

Selection of the sub-meeting hosts is needed since each sub-meeting will employ E2E encryption and therefore, cryptographic keys must be obtained by one of the participants, rather than being supplied by the video conference provider 310. Thus, a sub-meeting participant 330a-k can be used to generate and distribute cryptographic keys to encrypt and decrypt multimedia streams transmitted during the sub-meeting. It should be appreciated that while the sub-meeting hosts distribute cryptographic keys to each of the sub-meeting participants, in some examples, sub-meeting hosts may also distribute their respective cryptographic keys to the main meeting host, even if the main meeting host is not joined to a respective sub-meeting. Such functionality may enable the main meeting host, e.g., a teacher or facilitator, to join or observe any sub-meeting, even if the main meeting host has not been assigned to the sub-meeting. It should be appreciated that, while this example employs a different participant as each different sub-meeting host, in some examples, a single participant may be selected as the host for all sub-meetings, such as the main meeting host. In one such example, the main meeting host is selected as the sub-meeting host for each of the sub-meetings. The main meeting host then generates cryptographic keys for each sub-meeting and distributes the respective cryptographic key for a sub-meeting to the participants of that sub-meeting.

At block 440, the video conference provider 310 transmits an indication that the respective participant is a host of the corresponding sub-meeting. In this example, the video conference provider 310 transmits a message to each selected sub-meeting host to indicate that the participant is a sub-meting host. Though in some examples, the video conference provider 310 may instead transmit a message to the host of the main meeting identifying the selected sub-meeting hosts. The main meeting host may then communicate with the selected sub-meeting hosts to notify each that they have been selected as sub-meeting hosts.

At block 450, the video conference provider 310 joins one or more participants to each sub-meeting. As discussed above, participants may self-select a breakout room to join, and therefore select a sub-meeting for their client device to join. In such an example, the participants may send indications to the video conference provider 310 identifying a breakout room to join. In response, the video conference provider 310 may join the participants to the sub-meetings corresponding to the selected breakout rooms. In some examples, the video conference provider 310 may autonomously join the participants to sub-meetings, such as based on a predetermined assignment received from the main meeting host or at random. Further, it should be appreciated that while block 450 is depicted as following block 440 in this example, in other examples, it may precede block 440 or may occur substantially simultaneously with block 440.

At block 460, the video conference provider 310 facilitates communications between the sub-meeting participants in their respective sub-meetings, generally as described above with respect to block 410 and FIGS. 1-2.

At block 470, the video conference provider 310 determines that a sub-meeting host for a sub-meeting has disconnected from the sub-meeting. For example, the video conference provider 310 may determine that the sub-meeting host has stopped responding to the video conference provider 310, e.g., after a timeout period, or has intentionally disconnected from the sub-meeting or the video conference provider, as selected an option to return to the main meeting, or has been removed from the sub-meeting by the main meeting host.

At block 480, after determining that the sub-meeting host has disconnected from the sub-meeting, the video conference provider 310 may select a new sub-meeting host, generally as described above with respect to block 430. In some examples, the video conference provider 310 may immediately select a new sub-meeting host, though in some examples, it may delay for a period of time, e.g., 30 or 60 seconds, while it waits for the sub-meeting host to re-join the sub-meeting. In one example, where one participant is selected as the sub-meeting host for all sub-meetings, the video conference provider 310 may determine that the sub-meeting host has disconnected from the sub-meeting only when the sub-meeting host has disconnected from the video conference provider. In one such example, the common sub-meeting host may not be joined to all sub-meetings, but may still manage generating and distributing cryptographic keys to each of the participants in each sub-meeting.

Figure 5:
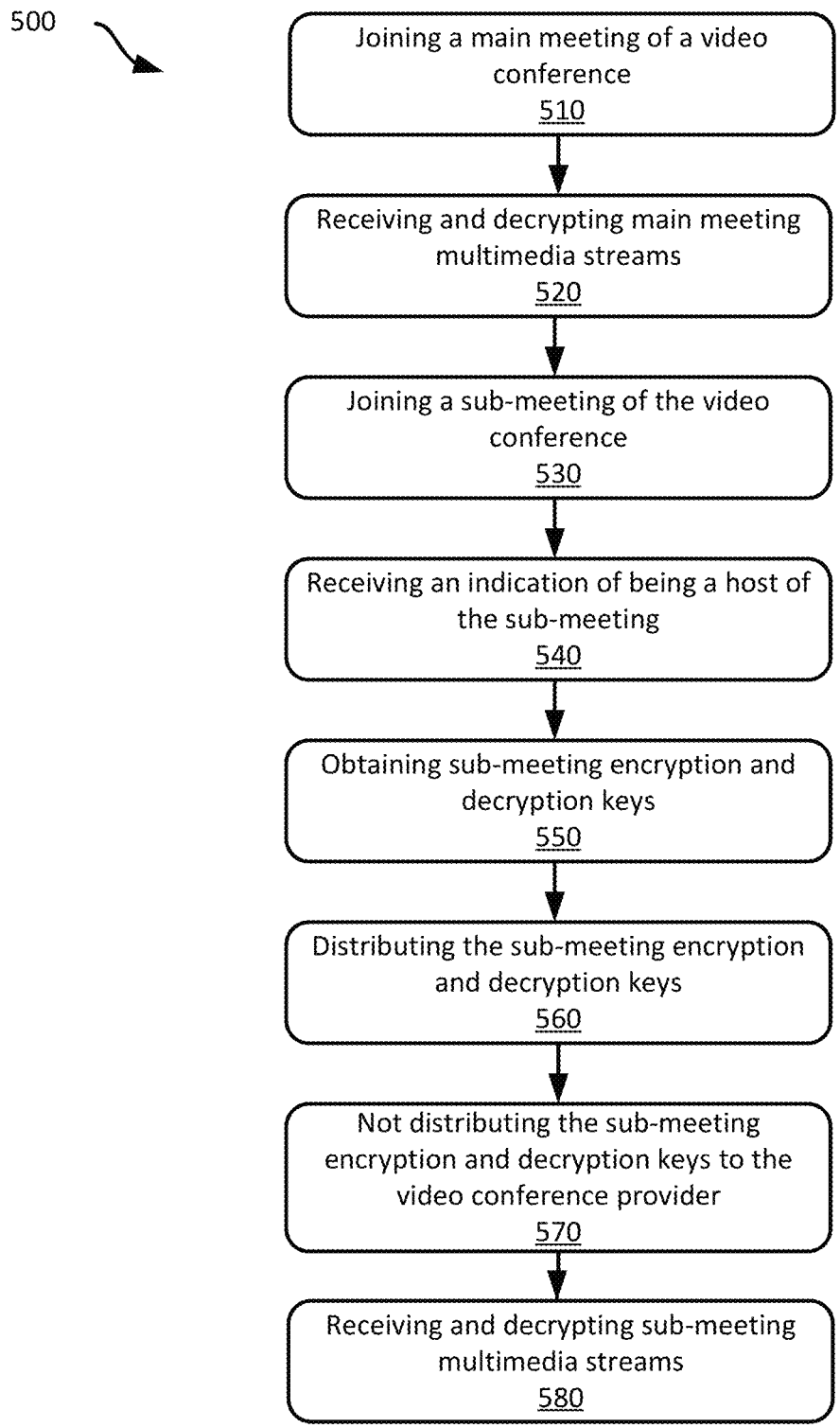

Referring now to FIG. 5, FIG. 5 shows an example method 500 for enabling sub-meetings in encrypted video conferences. This example method 500 will be discussed with respect to the example system 300 shown in FIGS. 3A-3B, but it should be appreciated that any suitable system according to this disclosure may be employed.

At block 510, a participant, using their client device (e.g., client device 330*a*), joins a main meeting of a video conference generally as described above with respect to FIGS. 1-3. In this example, the participant is not the main meeting host and receives one or more meeting cryptographic keys from the main meeting host. However, in some examples, the participant may be the meeting host and thus may generate and distribute one or more meeting cryptographic keys, generally as described above with respect to FIG. 3.

At block 520, the participant's client device 330*a* receives and decrypts encrypted multimedia streams received from other participants' client devices 320, 330*b-k* in the main meeting via the video conference provider 310 using a meeting cryptographic key. As discussed above, the meeting may be encrypted using symmetric cryptographic keys or asymmetric cryptographic keys. If the meeting uses symmetric keys, the participant's client device 330*a* encrypts its multimedia stream and decrypts received multimedia streams using the same cryptographic key. However, if asymmetric keys are used, the participant's client device 330*a* encrypts multimedia streams using one cryptographic key and decrypts received multimedia streams using another cryptographic key.

At block 530, the participant joins a sub-meeting 350*a-m* of the video conference. In some examples, the participant may be automatically joined to the sub-meeting 350*a-m* by the video conference provider 310 based on a predetermined allocation of participants to sub-meetings 350*a-m*. Alternatively, the participant (or the host) may select a breakout room for the participant to join and be joined to the corresponding sub-meeting by the video conference provider 310.

At block 540, the participant's client device 330*a* receives an indication identifying the client device 330*a* as a host of the sub-meeting. In this example, the client device 330*a* receives a message from the video conference provider 310 identifying the client device as the host of the sub-meeting before the client device 330*a* joins the sub-meeting, though in some examples, the client device 330*a* may receive the indication after joining the sub-meeting.

At block 550, the client device 330*a* obtains encryption and decryption keys corresponding to the sub-meeting. In this example, the client device 330*a* generates a symmetric encryption key that will serve as both the encryption; however, in some examples, it may generate asymmetric encryption keys. Further, in some examples, it may obtain the encryption and decryption key from a cryptographic key server or another remote device, such as the host's client device 320.

It should be appreciated that while this block references two keys—an encryption key and a decryption key—in some examples, these may be the same key. Thus, obtaining the sub-meeting encryption and decryption keys may only involve obtaining a single cryptographic key.

At block 560, the client device 330*a* distributes the encryption and decryption keys to the other participants in the sub meeting, generally as discussed above with respect to FIG. 3. However, it should be appreciated that, similar to block 550, in some examples only a single cryptographic key may be obtained and distributed. Thus, distributing the encryption and decryption keys may involve distributing only one key.

At block 570, the client device 330*a* does not distribute the sub-meeting encryption and decryption keys to the video conference provider 310. In this example, the client device 330*a* does not provide the encryption and decryption keys to the video conference provider 310 in any form. However, as discussed above, in some examples, the video conference provider 310 may be provided encrypted copies of encryption and decryption keys that it is not able to decrypt. Thus, in some examples, the client device 330*a* may encrypt the encryption and decryption keys and provide the encrypted copies to the video conference provider 310, thereby denying access to the encryption and decryption keys. In such an embodiment, the client device 330*a* has still not provided the encryption and decryption keys to the video conference provider 310 because the video conference provider 310 lacks access to them. Further, it should be appreciated that, similar to blocks 550 and 560, in some examples only a single cryptographic key may be obtained, and thus block 570 may be performed with only a single sub-meeting cryptographic key.

At block 580, the client device receives and decrypts encrypted sub-meeting multimedia streams from one or more of the sub-meeting participants using the encryption and decryption keys generally as described above with respect to block 520. Further, and as discussed above, it should be appreciated that, similar to blocks 550-570, in some examples only a single cryptographic key may be obtained, and thus block 580 may be performed with only a single sub-meeting cryptographic key.

Figure 6:
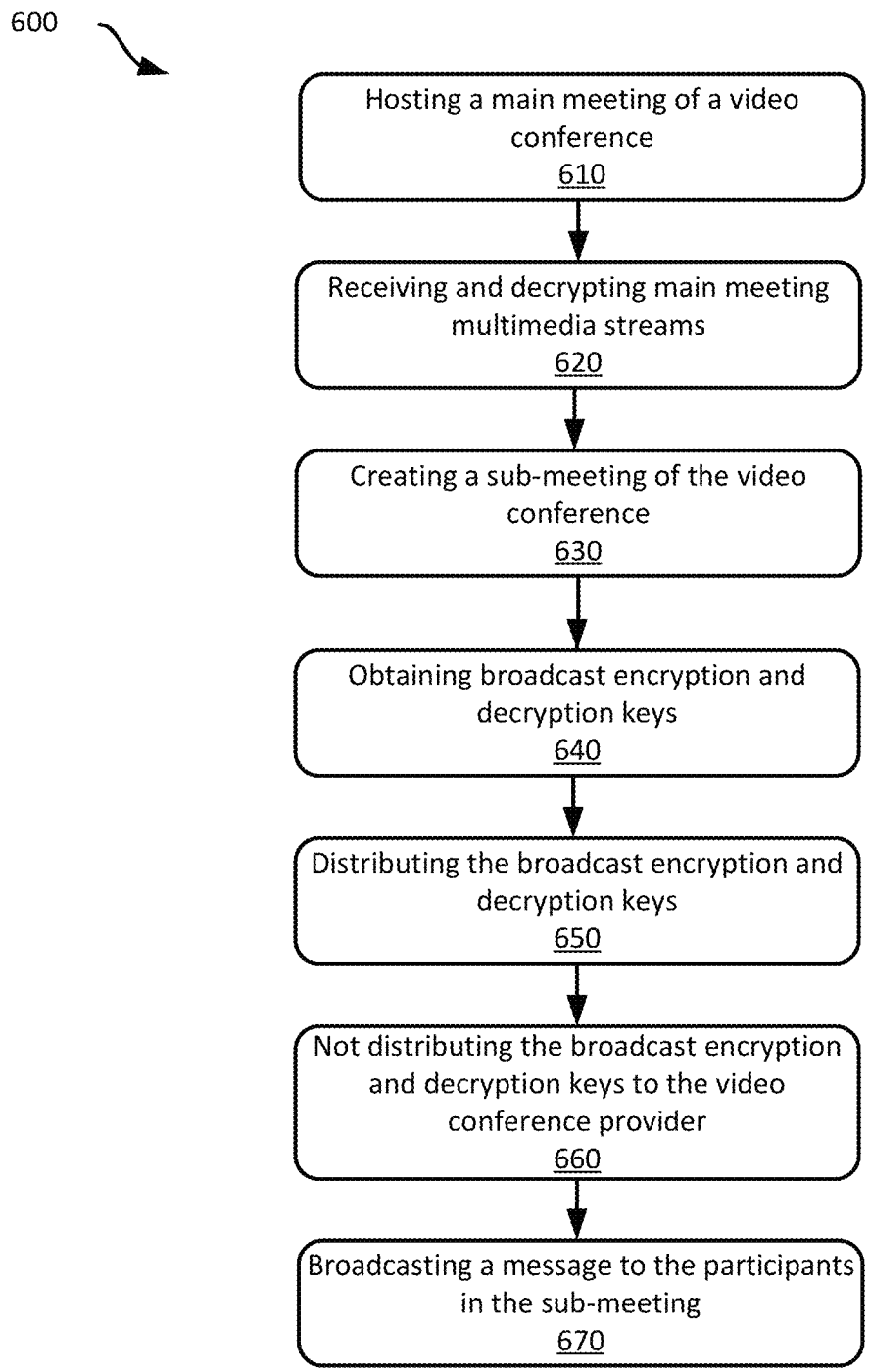

Referring now to FIG. 6, FIG. 6 shows an example method 600 for enabling sub-meetings in encrypted video conferences. This example method 600 will be discussed with respect to the example system 300 shown in FIGS. 3A-3B, but it should be appreciated that any suitable system according to this disclosure may be employed.

At block 610, a host client device 320 hosts a main meeting of a video conference using the video conference provider 310. In this example, the host client device 320 schedules a video conference with the video conference provider 310 and invites a number of participants to the main meeting. When the main meeting begins, the host joins and distributes main meeting encryption and decryption keys generally as described above with respect to FIGS. 3A-3B.

At block 620, the host client device 320 receives and decrypts main meeting multimedia streams received from other participants in the main meeting, generally as described above.

At block 630, the host client device 320 creates a sub-meeting of the video conference, generally as described above with respect to FIGS. 3A-3B.

At block 640, the host client device 320 obtains broadcast encryption and decryption keys generally as described above with respect to obtaining encryption and decryption keys. Further, as described above, a single cryptographic key may be employed as both the broadcast encryption and decryption keys. However, in this example, the broadcast encryption and decryption keys are different from the main meeting encryption and decryption keys. They are also different from the sub-meeting encryption and decryption keys. Instead, the broadcast encryption and decryption keys enable the host of the main meeting to broadcast content to the sub-meeting. Thus, the participants in the sub-meeting can receive and decrypt the broadcasted content, however, because they have left the main meeting, will no longer have access to other content exchanged through the main meeting. Using such broadcast encryption and decryption keys can enable the host of the video conference to send information to participants in the sub-meeting (or any other sub-meetings to which the broadcast encryption and decryption keys have been shared), but without requiring the host of the video conference to leave the main meeting. Further, if multiple sub-meetings are created, the host client device 320 may obtain a distribute the same broadcast encryption and decryption keys to all sub-meetings, or only to a subset of the sub-meetings. Or it may distribute different broadcast encryption and decryption keys to different sub-meetings (or subsets of sub-meetings) to enable different broadcast content to be sent to different sub-meetings (or subsets of sub-meetings).

At block 650, the host client device 320 distributes the broadcast encryption and decryption keys to all of the participants in the sub-meeting, generally as described above with respect to key distribution.

At block 660, the host client device 320 does not distribute the broadcast encryption and decryption keys to the video conference provider 310. In this example, the host client device 320 does not provide the encryption and decryption keys to the video conference provider 310 in any form. However, as discussed above, in some examples, the video conference provider 310 may be provided encrypted copies of encryption and decryption keys that it is not able to decrypt. Thus, in some examples, the host client device 320 may encrypt the broadcast encryption and decryption keys and provide the encrypted copies to the video conference provider 310, thereby denying access to the encryption and decryption keys. In such an embodiment, the host client device 320 has still not provided the encryption and decryption keys to the video conference provider 310 because the video conference provider 310 lacks access to them. Further, it should be appreciated that, as discussed above, in some examples only a single cryptographic key may be obtained, and thus block 570 may be performed with only a single sub-meeting cryptographic key.

At block 670, the host client device 320 broadcasts a message to the participants in the sub-meeting from the main meeting using the broadcast encryption key via the video conference provider 310. In this example, the host client device 320 transmits a message to the video conference provider instructing the video conference provider 310 to provide one or more multimedia streams to the participants in the sub-meeting, to which the participants subscribe. The host client device 320 then encrypts broadcast information using the broadcast encryption key and transmits the encrypted broadcast information via the one or more multimedia streams. The participant client devices that are connected to the sub-meeting receive the multimedia stream(s) and decrypt the received content using the broadcast decryption key. The decrypted content is then presented to the respective participants. Using such a technique, a host of a main meeting may broadcast content to one or more sub-meetings of a main meeting without needing to individually join each sub-meeting to convey the information. For example, the host may broadcast a time remaining until the participants need to rejoin the main meeting.

Figure 7:
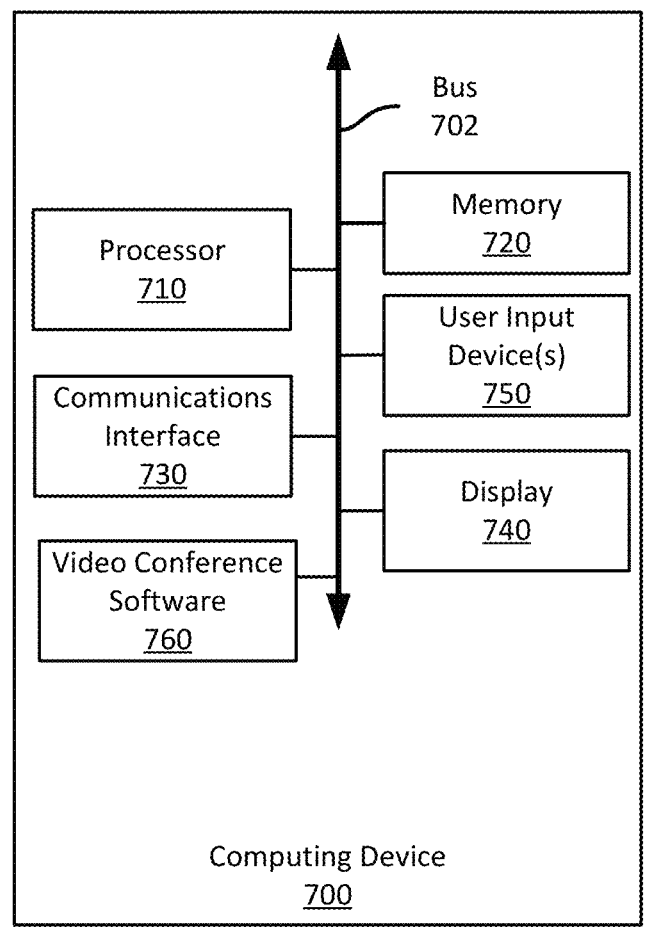
FIG. 7 shows an example computing device suitable for use with systems and methods for enabling sub-meetings in encrypted video conferences.

Referring now to FIG. 7, FIG. 7 shows an example computing device 700 suitable for use in example systems or methods for enabling breakout rooms in webinars according to this disclosure. The example computing device 700 includes a processor 710 which is in communication with the memory 720 and other components of the computing device 700 using one or more communications buses 702. The processor 710 is configured to execute processor-executable instructions stored in the memory 720 to perform one or more methods for enabling breakout rooms in webinars according to different examples, such as part or all of the example methods 400-600 described above with respect to FIGS. 4-6. The computing device 700, in this example, also includes one or more user input devices 750, such as a keyboard, mouse, touchscreen, microphone, etc., to accept user input. The computing device 700 also includes a display 740 to provide visual output to a user.

In addition, the computing device 700 includes video conference software 760 to enable a user to join and participate in a video conference, such as a conventional meeting or webinar, by receiving multimedia streams from a video conference provider, sending multimedia streams to the video conference provider, joining and leaving breakout rooms, such as described throughout this disclosure, etc.

The computing device 700 also includes a communications interface 740. In some examples, the communications interface 730 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random-access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
   joining, by a first client device associated with a first participant, a sub-meeting of a main meeting of a video conference hosted by a video conference provider, the sub-meeting including a plurality of participants;
   receiving, by the first client device, an indication of being a host of the sub-meeting;
   responsive to receiving the indication of being a host, obtaining, by the first client device, sub-meeting encryption and decryption keys;
   distributing, by the first client device, the sub-meeting encryption and decryption keys to only each other participant of the plurality of participants; and
   exchanging, by the first client device, encrypted multimedia streams with the other participants of the plurality of participants, the encrypted multimedia streams encrypted using the sub-meeting encryption key.

2. The method of claim 1, wherein the encryption and decryption keys are the same symmetric key.

3. The method of claim 1, further comprising:
   receiving an indication of a new participant joining the sub-meeting; and
   distributing the encryption and decryption keys to the new participant.

4. The method of claim 1, further comprising:
   responsive to receiving an indication of a new participant joining the sub-meeting, generating new sub-meeting encryption and decryption keys;
   wherein distributing the sub-meeting encryption and decryption keys to the new participant comprises distributing the new sub-meeting encryption and decryption keys to each other participant of the plurality of participants and the new participant; and
   exchanging, by the first client device, encrypted multimedia streams with the other participants of the plurality of participants, the encrypted multimedia streams encrypted using the new sub-meeting encryption key.

5. The method of claim 1, wherein receiving the indication of being a host of the sub-meeting is responsive to a previous host leaving the sub-meeting.

6. The method of claim 1, further comprising:
   receiving, by the first client device, an indication of being the host of a plurality of sub-meetings;
   responsive to receiving the indication of being the host, obtaining, by the first client device, a plurality of sub-meeting encryption and decryption keys; and
   distributing, by the first client device for a respective sub-meeting, the respective sub-meeting encryption and decryption keys to only each other participant of the plurality of participants of the respective sub-meeting.

7. The method of claim 1, further comprising:
   returning to the main meeting of the video conference, the main meeting including a second plurality of participants;
   receiving, by the first client device, an indication of being a host of the main meeting;
   responsive to receiving the indication of being the host of the main meeting, obtaining, by the first client device, main meeting encryption and decryption keys;
   distributing, by the first client device, the main meeting encryption and decryption keys to only each other participant of the second plurality of participants; and
   exchanging, by the first client device, encrypted multimedia streams with the other participants of the second plurality of participants, the encrypted multimedia streams encrypted using the main meeting encryption key.

8. A system comprising:
   a communications interface;
   a non-transitory computer-readable medium; and
   one or more processors communicatively coupled to the communications interface and the non-transitory computer-readable medium, the one or more processors configured to execute processor-executable instructions stored in the non-transitory computer-readable medium to:
   join a sub-meeting of a main meeting of a video conference hosted by a video conference provider, the sub-meeting including a plurality of participants;
   receive an indication of being a host of the sub-meeting;
   responsive to receiving the indication of being a host, obtain sub-meeting encryption and decryption keys;
   distribute the sub-meeting encryption and decryption keys to only each other participant of the plurality of participants; and
   exchange encrypted multimedia streams with the other participants of the plurality of participants, the encrypted multimedia streams encrypted using the sub-meeting encryption key.

9. The system of claim 8, wherein the encryption and decryption keys are the same symmetric key.

10. The system of claim 8, wherein the one or more processors are configured to execute further processor-executable instructions stored in the non-transitory computer-readable medium to:
   receive an indication of a new participant joining the sub-meeting; and
   distribute the encryption and decryption keys to the new participant.

11. The system of claim 8, wherein the one or more processors are configured to execute further processor-executable instructions stored in the non-transitory computer-readable medium to:
   responsive to receiving an indication of a new participant joining the sub-meeting, generate new sub-meeting encryption and decryption keys;
   distribute the new sub-meeting encryption and decryption keys to each other participant of the plurality of participants and the new participant; and
   exchange encrypted multimedia streams with the other participants of the plurality of participants, the encrypted multimedia streams encrypted using the new sub-meeting encryption key.

12. The system of claim 8, wherein receiving the indication of being a host of the sub-meeting is responsive to a previous host leaving the sub-meeting.

13. The system of claim 8, wherein the one or more processors are configured to execute further processor-executable instructions stored in the non-transitory computer-readable medium to:
   receive an indication of being the host of a plurality of sub-meetings;
   responsive to receiving the indication of being the host, obtain a plurality of sub-meeting encryption and decryption keys; and
   distributing, for a respective sub-meeting, the respective sub-meeting encryption and decryption keys to only each other participant of the plurality of participants of the respective sub-meeting.

14. The system of claim 8, wherein the one or more processors are configured to execute further processor-executable instructions stored in the non-transitory computer-readable medium to:
   return to the main meeting of the video conference, the main meeting including a second plurality of participants;
   receive an indication of being a host of the main meeting;
   responsive to receiving the indication of being the host of the main meeting, obtain main meeting encryption and decryption keys;
   distribute the main meeting encryption and decryption keys to only each other participant of the second plurality of participants; and
   exchange encrypted multimedia streams with the other participants of the second plurality of participants, the encrypted multimedia streams encrypted using the main meeting encryption key.

15. A non-transitory computer-readable medium comprising processor-executable instructions configured to cause one or more processors to:
   join a sub-meeting of a main meeting of a video conference hosted by a video conference provider, the sub-meeting including a plurality of participants;
   receive an indication of being a host of the sub-meeting;
   responsive to receiving the indication of being a host, obtain sub-meeting encryption and decryption keys;
   distribute the sub-meeting encryption and decryption keys to only each other participant of the plurality of participants; and
   exchange encrypted multimedia streams with the other participants of the plurality of participants, the encrypted multimedia streams encrypted using the sub-meeting encryption key.

16. The non-transitory computer-readable medium of claim 15, wherein the encryption and decryption keys are the same symmetric key.

17. The non-transitory computer-readable medium of claim 15, further comprising processor-executable instructions configured to cause the one or more processors to:
   receive an indication of a new participant joining the sub-meeting; and
   distribute the encryption and decryption keys to the new participant.

18. The non-transitory computer-readable medium of claim 15, further comprising processor-executable instructions configured to cause the one or more processors to:
   responsive to receiving an indication of a new participant joining the sub-meeting, generate new sub-meeting encryption and decryption keys;
   distribute the new sub-meeting encryption and decryption keys to each other participant of the plurality of participants and the new participant; and
   exchange encrypted multimedia streams with the other participants of the plurality of participants, the encrypted multimedia streams encrypted using the new sub-meeting encryption key.

19. The non-transitory computer-readable medium of claim 15, wherein receiving the indication of being a host of the sub-meeting is responsive to a previous host leaving the sub-meeting.

20. The non-transitory computer-readable medium of claim 15, further comprising processor-executable instructions configured to cause the one or more processors to:
   receive an indication of being the host of a plurality of sub-meetings;
   responsive to receiving the indication of being the host, obtain a plurality of sub-meeting encryption and decryption keys; and
   distributing, for a respective sub-meeting, the respective sub-meeting encryption and decryption keys to only each other participant of the plurality of participants of the respective sub-meeting.

\* \* \* \* \*